(12) United States Patent
Malzbender

(10) Patent No.: US 6,297,834 B1
(45) Date of Patent: Oct. 2, 2001

(54) DIRECTION-DEPENDENT TEXTURE MAPS IN A GRAPHICS SYSTEM

(75) Inventor: Thomas Malzbender, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/329,553

(22) Filed: Jun. 10, 1999

(51) Int. Cl.$^7$ .................................................. G06T 11/40
(52) U.S. Cl. ................................................................ 345/586
(58) Field of Search .................................. 345/430, 582, 345/586, 584

(56) References Cited

U.S. PATENT DOCUMENTS

| | | | |
|---|---|---|---|
| 5,490,240 | * | 2/1996 | Foran et al. . |
| 5,696,892 | * | 12/1997 | Redmann et al. . |
| 6,049,337 | * | 4/2000 | Van Overveld . |
| 6,078,332 | * | 6/2000 | Ohazama . |

OTHER PUBLICATIONS

Levoy, M., Hanrahan, P., "Light Field Rendering", Proceedings of IEEE Siggraph 96, pp. 31–42, Aug. 1996.

Debevec. P., Talylor, C., Malik, J., "Modeling and Rendering Architecuture from Photographcs: A Hybrid Geometry–and Image–Based Approach", Proceedings of IEEE Siggraph 96, pp. 11–20, Aug. 1996.

Dana, K., Nayar, S., Ginneken, B., Koenderink, J., "Reflectance and Texture or Real World Surfaces", Proceedings of Computer Vision and Pattern Recognition Conference 97, p 151, 1997.

Rushmeir, H., Taubin, G., Gueziec, A., "Applying Shape from Lighting Variation to Bump Map Capture", Rendering Techniques 97–Proceedings of the Eurographics Workshop, Jun. 16–18, 1997, ISBN 3211830014.

\* cited by examiner

*Primary Examiner*—Jeffery Brier

(57) ABSTRACT

A graphics system that renders surface features of 3D object in a manner that is direction dependent but without the time consuming and expensive calculations involved in the evaluation of lighting equations on a per pixel basis. The graphics system employs direction-dependent texture maps which hold parameters that define surface structures in a manner in which the appearance of a surface structure varies in response to a direction vector. The direction vector may be light source direction or view direction. The parameters are those of a predetermined polynomial equation the evaluation of which does not involve vector calculations.

20 Claims, 4 Drawing Sheets

DIRECTION-DEPENDENT TEXTURE MAPS IN A GRAPHICS SYSTEM

BACKGROUND OF THE INVENTION

1. Field of Invention

The present invention pertains to the field of computer graphics systems. More particularly, this invention relates to direction-dependent texture maps in a computer graphics system.

2. Art Background

A typical computer graphics system includes a display device having a two-dimensional (2D) array of light emitting areas. The light emitting areas are usually referred to as pixels. Such a computer graphics system typically implements hardware and/or software for generating a 2D array of color values that determine the colors that are to be emitted from the corresponding pixels of the display device.

Such computer graphics systems are commonly employed for the display of three-dimensional (3D) objects. Typically, such a computer graphics system generates what appears to be a 3D object on a 2D display device by generating 2D views of the 3D object. The 2D view of a 3D object which is generated at a particular time usually depends on a spatial relationship between the 3D object and a viewer of the 3D object at the particular time. This spatial relationship may be referred to as the view direction.

The process by which a computer graphics system generates the color values for a 2D view of a 3D object is commonly referred to as image rendering or scan conversion. A computer graphics system usually renders a 3D object by subdividing the 3D object into a set of polygons and rendering each of the polygons individually.

The color values for a polygon that are rendered for a particular view direction usually depend on the surface features of the polygon and the effects of lighting on the polygon. The surface features include features such as surface colors and surface structures. The effects of lighting usually depend on a spatial relationship between the polygon and one or more light sources. This spatial relationship may be referred to as the light source direction.

Typically, the evaluation of the effects of lighting on an individual pixel in a polygon for a particular view direction involves a number of 3D vector calculations. These calculations usually include floating-point square-root and divide operations. Such calculations are usually time consuming and expensive whether performed in hardware or software.

One prior method for reducing such computation overhead is to evaluate the effects of lighting at just a few areas of a polygon, such as the vertices, and then interpolate the results across the entire polygon. Examples of these methods include methods which are commonly referred to as flat shading and Gouraud shading. Such methods usually reduce the number of calculations that are performed during scan conversion and thereby increase rendering speed. Unfortunately, such methods also usually fail to render shading features that are smaller than the areas of individual polygons.

One prior method for rendering features that are smaller than the area of a polygon is to employ what is commonly referred to as a texture map. A typical texture map is a table that contains a pattern of color values for a particular surface feature. For example, a wood grain surface feature may be rendered using a texture map that holds a color pattern for wood grain.

Unfortunately, texture mapping usually yields relatively flat surface features that do not change with the view direction or light source direction. The appearance of real 3D objects, on the other hand, commonly do change with the view direction and/or light source direction. These directional changes are commonly caused by 3D structures on the surface of a polygon. Such structures can cause localized shading or occlusions or changes in specular reflections from a light source. The effects can vary with view direction for a given light source direction and can vary with light source direction for a given view direction.

One prior method for handling the directional dependance of such structural effects in a polygon surface is to employ what is commonly referred to as a bump map. A typical bump map contains a height field from which a pattern 3D normal vectors for a surface are extracted. The normal vectors are usually used to evaluate lighting equations at each pixel in the surface. Unfortunately, such evaluations typically involve a number of expensive and time consuming 3D vector calculations, thereby decreasing rendering speed or increasing graphics system hardware and/or software costs.

SUMMARY OF THE INVENTION

A graphics system is disclosed that renders surface features of a 3D object in a manner that is direction dependent but without the time consuming and expensive calculations involved in the evaluation of lighting equations on a per pixel basis. The graphics system employs direction-dependent texture maps.

A direction-dependent texture map holds a set of parameters that define a surface structure in a manner in which the appearance of the surface structure varies in response to a direction vector. The direction vector may be a light source vector or an eye point vector. The parameters are those of a predetermined polynomial equation the evaluation of which does not involve vector calculations. The graphic system renders a polygon with the surface structure using the polynomial equation.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
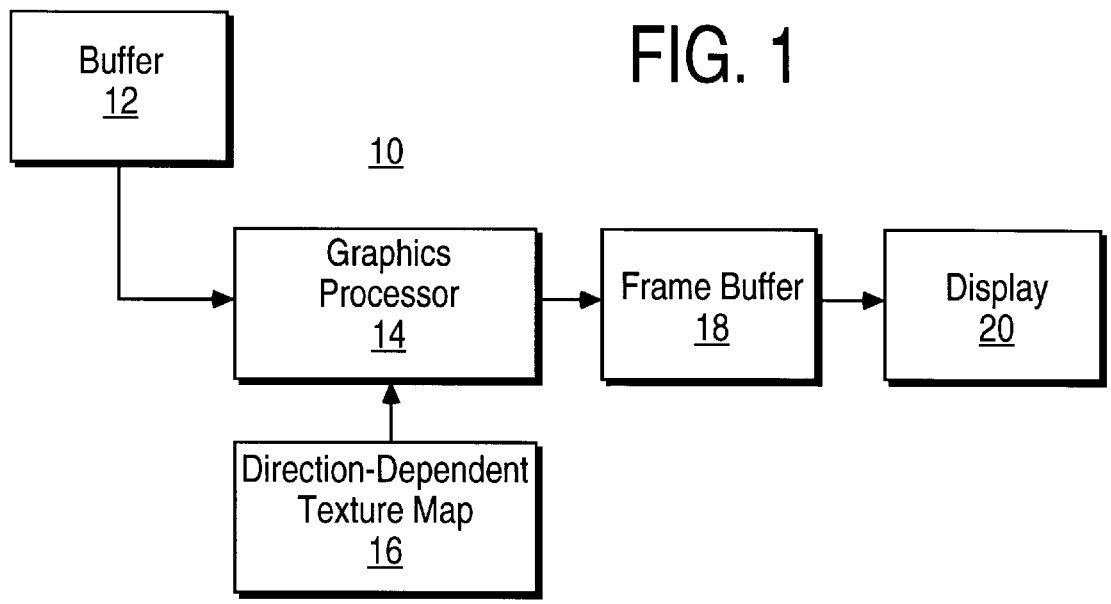
FIG. 1 shows a computer graphics system that renders surface features of 3D object using the present techniques.

FIG. 1 shows a computer graphics system 10 that incorporates the teachings disclosed herein. The computer graphics system 10 includes a buffer 12, a graphics processor 14, a direction-dependent texture map 16, a frame buffer 18, and a display 20.

The buffer 12 holds geometry data that describes a 3D object which is to be generated on the display 20. The 3D object is represented in the buffer 12 as a set of polygons in a 3D space. In one embodiment, the polygons are triangles and the geometry data in the buffer 12 includes the 3D coordinates of the vertices the triangles.

The graphics processor 14 reads the parameters that define the polygons from the buffer 12 and scan converts each polygon. The scan conversion of a polygon yields a 2D view of the polygon which depends on a view direction and a light source direction. A 2D view of a polygon includes a color value for each pixel of the polygon which is visible in the plane of the display 20. The graphics processor 14 writes the color values for the rendered polygons into the frame buffer 18. The color values from the frame buffer 18 are provided to the display 20. The display 20 is a 2D display device such as a raster scan device or flat-panel display device.

The direction-dependent texture map 16 holds parameters that define a surface structure in a manner in which the appearance of the surface structure varies with either view direction or light source direction. The graphics processor 14 maps the surface structure defined in the direction-dependent texture map 16 onto the polygons obtained from the buffer 12 during scan conversion. The result is a more realistic rendering of 3D features in a surface on a 3D object in comparison to texture mapping but without the computational penalties associated with bump mapping.

In one embodiment, the parameters contained in the direction-dependent texture map 16 are the A1, A2, A3, A4, A5, and A6 coefficients for evaluating the following second order polynomial equation (equation 1).

$$C_i = A1 D_u^2 + A2 D_v^2 + A3 D_u D_v + A4 D_u + A5 D_v + A6$$

The terms $D_u$ and $D_v$ are the 2D components of an eye point vector if the direction-dependent texture map 16 is adapted to view direction. The terms $D_u$ and $D_v$ are the 2D components of a light source vector if the direction-dependent texture map 16 is adapted to light source direction.

The following table illustrates the contents of the direction-dependent texture map 16. The direction-dependent texture map 16 contains n by m entries. Each of the n by m entries corresponds to a sample of a particular surface modeled by the direction-dependent texture map 16. These samples may be referred to as texels. The coefficients for an individual texel are denoted as $A1_{i,j}$–$A6_{i,j}$ wherein i ranges from 0–n and j ranges from 0–m.

| | | | |
|---|---|---|---|
| $A1_{0,0}$ $A2_{0,0}$ | $A1_{0,1}$ $A2_{0,1}$ | | $A1_{0,m}$ $A2_{0,m}$ |
| $A3_{0,0}$ $A4_{0,0}$ | $A3_{0,1}$ $A4_{0,1}$ | . . . | $A3_{0,m}$ $A4_{0,m}$ |
| $A5_{0,0}$ $A6_{0,0}$ | $A5_{0,1}$ $A6_{0,1}$ | | $A5_{0,m}$ $A6_{0,m}$ |
| $A1_{1,0}$ $A2_{1,0}$ | $A1_{1,1}$ $A2_{1,1}$ | | $A1_{1,m}$ $A2_{1,m}$ |
| $A3_{1,0}$ $A4_{1,0}$ | $A3_{1,1}$ $A4_{1,1}$ | . . . | $A3_{1,m}$ $A4_{1,m}$ |
| $A5_{1,0}$ $A6_{1,0}$ | $A5_{1,1}$ $A6_{1,1}$ | | $A5_{1,m}$ $A6_{1,m}$ |
| . | . | | . |
| . | . | | . |
| . | . | | . |
| $A1_{n,0}$ $A2_{n,0}$ | $A1_{n,1}$ $A2_{n,1}$ | | $A1_{n,m}$ $A2_{n,m}$ |
| $A3_{n,0}$ $A4_{n,0}$ | $A3_{n,1}$ $A4_{n,1}$ | . . . | $A3_{n,m}$ $A4_{n,m}$ |
| $A5_{n,0}$ $A6_{n,0}$ | $A5_{n,1}$ $A6_{n,1}$ | | $A5_{n,m}$ $A6_{n,m}$ |

The direction-dependent texture map 16 is representative of a set of direction-dependent texture maps that may be used for rendering 3D objects in the graphics system 10. Each direction-dependent texture map according to the present techniques is adapted to a particular surface structure that is to be mapped onto a 3D object.

In addition, each direction-dependent texture map is adapted to provide realistic 3D rendering in response to either light source direction or view direction. For example, the direction-dependent texture map 16 may be adapted to provide realistic 3D rendering in response to a varying light source direction for a given fixed view direction. Alternatively, the direction-dependent texture map 16 may be adapted to provide realistic 3D rendering in response to a varying view direction for a given fixed light source direction.

A direction-dependent texture map is adapted to a particular color channel of the display 20. For example, the graphic system 10 may include a separate direction-dependent texture map for each of the red, green, and blue channels for an RGB display for a particular surface structure. Alternatively, a direction-dependent texture map may be used to model the luminance components for a particular surface structure and the corresponding chrominance components may be modeled as constants.

Figure 2:
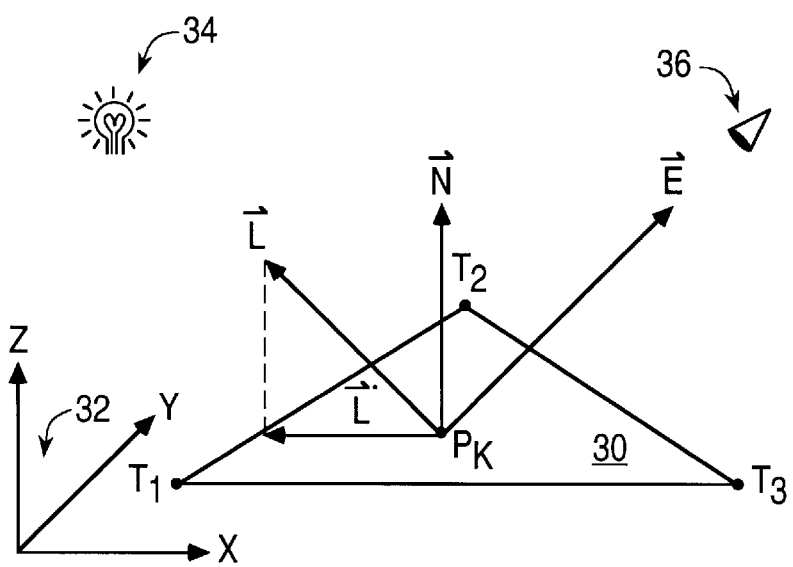
FIG. 2 shows a polygon which is defined in a buffer and which is to be rendered by the graphics processor using surface features defined by the direction-dependent texture map.

FIG. 2 shows a polygon 30 which is defined in the buffer 12 and which is to be rendered by the graphics processor 14 using surface features defined by the direction-dependent texture map 16. The polygon 30 is defined by a set of three vertices ($T_1$, $T_2$, and $T_3$) in a 3D space. The 3D space is represented by a set of X, Y, and Z axes 32.

A surface normal vector N for the polygon 30 is shown, along with an eye point vector E and a light source vector L. The eye point vector E represents a view direction from a pixel $P_k$ of the polygon 30 to an eye point 36. The light source vector L represents a light source direction from the pixel $P_k$ to a light source 34. Also shown is an L' vector which is the light source vector L projected down into the plane of the polygon 30.

Figure 3:
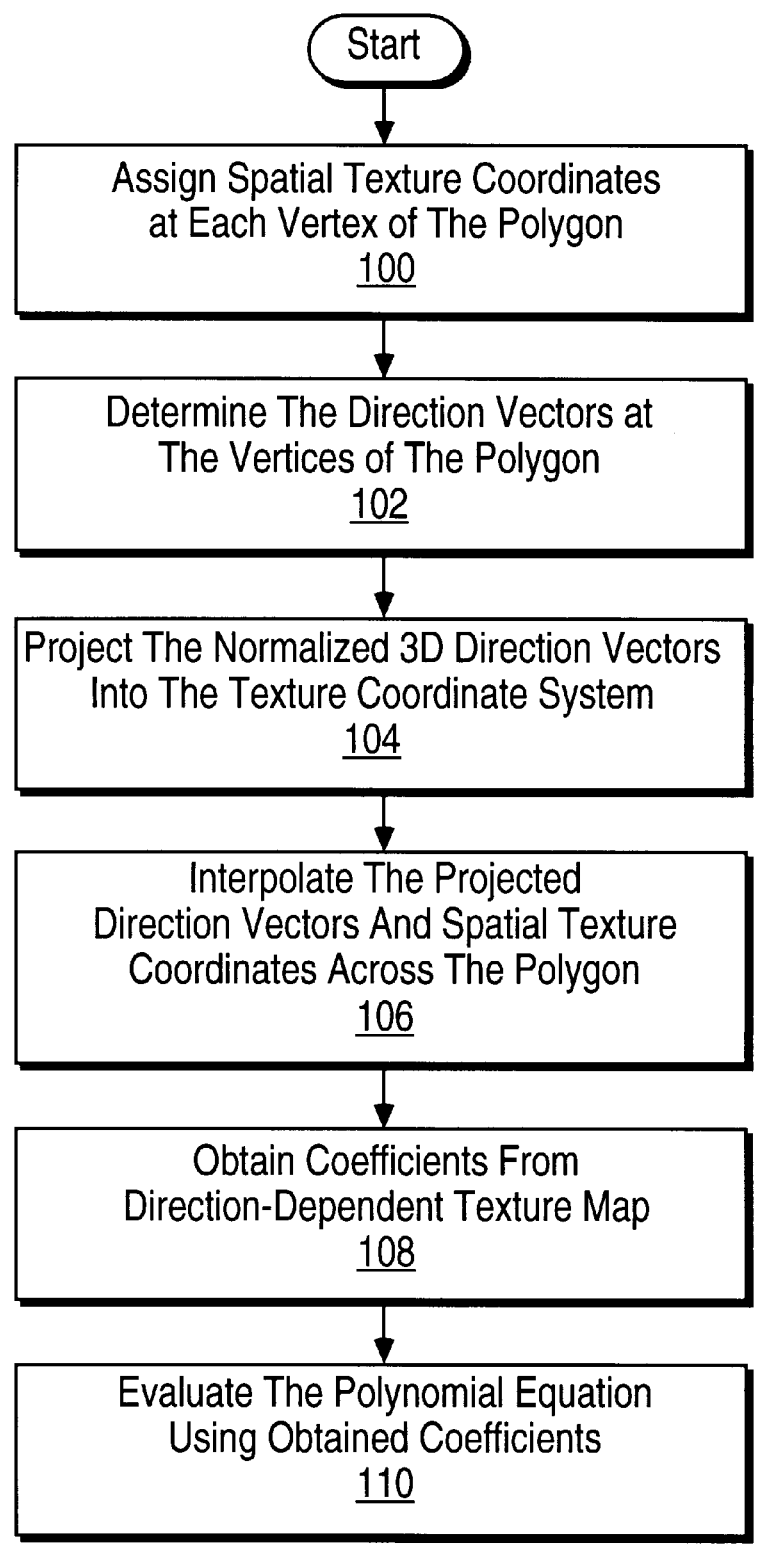
FIG. 3 shows a method for rendering a polygon using surface features defined by the direction-dependent texture map.

FIG. 3 shows a method for rendering the polygon 30 using surface features defined by the direction-dependent texture map 16. The steps shown are used to generate a color value for each of a set of pixels in the polygon 30. The following description for purposes of illustration focuses on the pixel $P_k$ as an example.

The coefficients $A1_{i,j}$–$A6_{i,j}$ in the direction-dependent texture map 16 are adapted to yield color values in response to a direction vector which may be a light source vector or an eye point vector. The following description for purposes of illustration focuses on an example in which the coefficients $A1_{i,j}$–$A6_{i,j}$ are adapted to yield color values in response to a light source vector for a fixed eye point vector. Nevertheless, these techniques are readily applicable to a direction-dependent texture map which contains coefficients that are adapted yield color values in response to an eye point vector for a fixed light source vector. In addition, the coefficients $A1_{i,j}$–$A6_{i,j}$ in the direction-dependent texture map 16 yield color values for a particular color channel of the display 20. Additional direction-dependent texture maps may be used to yield color values for the remaining channels.

At step 100, the graphics processor 14 assigns spatial texture u,v coordinates of the direction-dependent texture map 16 at each vertex $T_1$, $T_2$, and $T_3$ of the polygon 30. The spatial texture coordinates for the vertices $T_1$, $T_2$, and $T_3$ are denoted as $u_{T1}$, $v_{T1}$, $u_{T2}$, $v_{T2}$, and $u_{T3}$, $v_{T3}$, respectively.

At step 102, the graphics processor 14 determines direction vectors at the vertices of the polygon 30. The direction vectors in this example are light source vectors at the vertices of the polygon 30. The light source vector at the vertex $T_1$ is a normalized 3D vector that points from $T_1$ to the 3D coordinates of the light source 34. Similarly, the light source vector at the vertices $T_2$ and $T_3$ are normalized 3D vectors that point from $T_2$ and $T_3$, respectively, to the 3D coordinates of the light source 34.

At step 104, the graphics processor 14 projects the normalized 3D direction vectors determined at step 102 into the texture coordinate system u,v of the direction-dependent texture map 16. This yields a 2D parameterization or 2D components of each normalized 3D direction vector in the texture coordinate system u,v of the direction-dependent texture map 16. A 2D parameterization of a normalized 3D direction vector is denoted as $D_u$, $D_v$.

At step 106, the graphics processor 14 interpolates the projected direction vectors $D_u$, $D_v$ determined at step 104 and spatial texture coordinates $u_{T1}$, $v_{T1}$, $u_{T2}$, $v_{T2}$, and $u_{T3}$, $v_{T3}$ determined at step 100 across the polygon 30. This associates each pixel of the polygon 30 with $D_u$, $D_v$ parameters and with u,v texel coordinates in the coordinate space of the direction-dependent texture map 16. The interpolation performed at step 104 may be performed using a variety of known techniques.

At step 108, the graphics processor 14 obtains the polynomial coefficients $A1_{i,j}$–$A6_{i,j}$ from the direction-dependent texture map 16. For the pixel $P_k$, the polynomial coefficients $A1_{i,j}$–$A6_{i,j}$ are obtained from the texel of the direction-dependent texture map 16 that was associated with the pixel $P_k$ at step 106.

Assume that the interpolated u,v coordinates of the direction-dependent texture map 16 associated with pixel $P_k$ at step 106 is texel 3,34. This u, v coordinate interpolation may have been performed using nearest-neighbor, bilinear, or trilinear interpolation from a MIP map in response to fractional u and v values. The polynomial coefficients $A1_{i,j}$–$A6_{i,j}$ obtained from the entry 3,34 at step 108 are $A1_{3,34}$, $A2_{3,34}$, $A3_{3,34}$, $A4_{3,34}$, $A5_{3,34}$, and $A6_{3,34}$.

At step 110, the graphics processor 14 evaluates equation 1 using the interpolated $D_u$ and $D_v$ terms from step 106 and the coefficients $A1_{i,j}$–$A6_{i,j}$ from step 108 on a per pixel basis. For pixel $P_k$, equation 1 yields a texel value $C_i$ which may then be transformed by the graphics processor 14 into a color value using a lookup table or a 3×4 color transformation.

The present techniques model the 3D effects of surface features by modeling the contribution of those features to surface colors directly. The contributions are then represented by the coefficients of equation 1. The present techniques yield a mapping of surface features to a polygon that is direction dependent and that provides a quality of realism which is comparable to that yielded by the evaluation of lighting equations on a per pixel basis. Yet the evaluation of equation 1, a second order polynomial, is relatively easy to perform in hardware and/or software in comparison to the evaluation of lighting equations on a per pixel basis. The evaluation of equation 1 involves integer multiply and add operations whereas the evaluation of lighting equations involves floating-point square-root and divide operations.

Figure 4A:
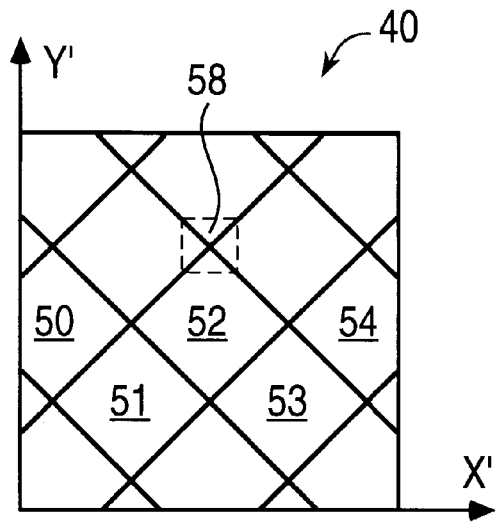
FIGS. 4a–4c illustrate an arrangement for determining the coefficients in a direction-dependent texture map for an example surface structure.
Figure 4B:
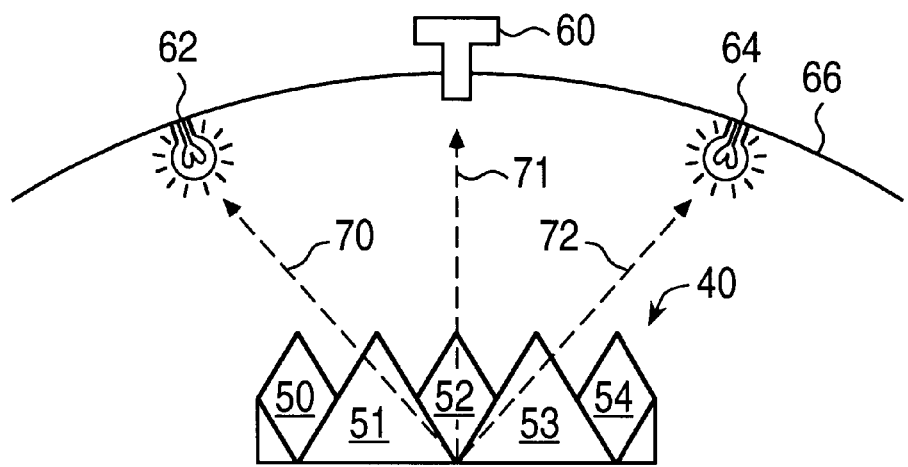
Figure 4C:
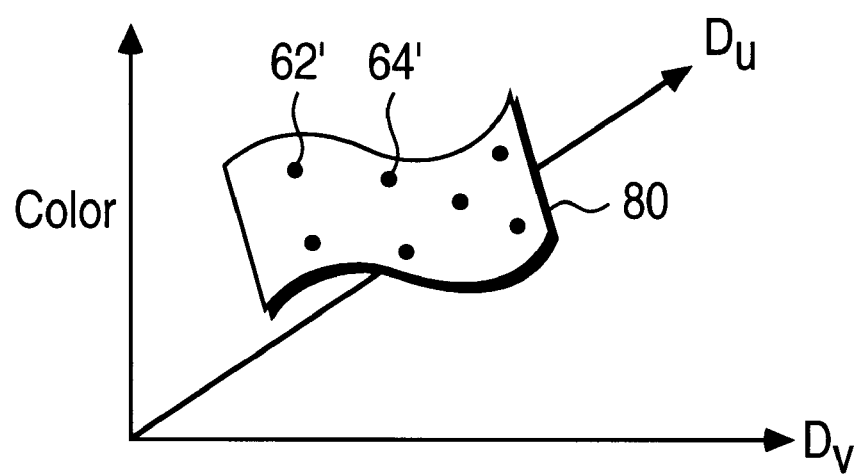

FIGS. 4a–4c illustrate an arrangement for determining the coefficients $A1_{i,j}$–$A6_{i,j}$ of the direction-dependent texture map 16 for an example surface structure 40. FIG. 4a shows a top view of the surface structure 40. The surface structure 40 is shown aligned to a pair of axes $D_u$ and $D_v$. The surface structure 40 includes a set of pyramid structures 50–54. A sub area 58 represents one of the texels of the surface structure 40. The surface structure 40 is just one example of a surface structure and any imaginable surface structure may be modeled using the present techniques.

FIG. 4b shows a side view of the surface structure 40 along with a dome 66 which is used to position a camera 60 and a light source. The light source is shown positioned at two example positions 62 and 64 on the dome 66. A vector 70 represents a light source vector for the position 62 and a vector 72 represents a light source vector for the position 64.

The camera 60 is fixed in its position on the dome 66 when obtaining coefficients for a direction-dependent texture map 16 that is adapted to yield color values in response to the light source vector. A vector 71 represents the eye point vector for the fixed position of the camera 60. The camera 60 is used to obtain an image of the surface structure 40 for each of a set of predetermined positions of the light source on the dome 66. Each predetermined position of the light source represents a different light source vector and the corresponding image obtained with the camera 40 yields a color value for each texel of the surface structure 40. For example, images obtained from N different positions of the light source yields N color values for each texel with each color value corresponding to a different light source vector for the eye point vector 71.

FIG. 4c shows a graph of the color values for the texel 58 obtained with the camera 60 for 6 different positions of the light source on the dome 66. These color values include a color value 62' which was obtained with the light source at position 62 and a color value 64' which was obtained with the light source at position 64. The color values are plotted against the axes $D_u$ and $D_v$.

The coefficients $A1_{i,j}$–$A6_{i,j}$ for the texel 58 for the eye point vector 71 are obtained by fitting the polynomial of equation 1 to the color values obtained for the texel 58 using known techniques. A surface 80 is shown that represents a fit between the polynomial of equation 1 and the 6 color values obtained by the camera 40 for the texel 58. The fit of the surface 80 to the N color values obtained by the camera 40 may be accomplished using standard least mean square methods the yield the polynomial coefficients.

This technique may readily be modified to obtain coefficients for a direction-dependent texture map 16 that is adapted to yield color values in response to the eye point vector. For example, the light source may be fixed at position 62 which corresponds to the light source vector 70. The camera 60 representing the eye point vector is moved to N different positions on the dome 66 and a surface fit to the obtained color values is performed in a manner similar to that described above.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A graphics system, comprising:

direction-dependent texture map that holds a set of parameters for a polynomial equation that defines a surface structure in a manner in which the appearance of the surface structure varies in response to a direction vector;

means for rendering a polygon having the surface structure by evaluating the polynomial equation using the direction vector and the parameters.

2. The graphics system of claim 1, wherein the direction vector is a light source vector.

3. The graphics system of claim 1, wherein the direction vector is an eye point vector.

4. The graphics system of claim 1, wherein the parameters are a set of coefficients for the polynomial equation.

5. The graphics system of claim 1, wherein the means for rendering includes means for evaluating the polynomial equation in response to a set of 2D components of the direction vector.

6. The graphics system of claim 5, wherein the 2D components lie in a plane of the polygon.

7. The graphics system of claim 1, wherein the means for rendering comprises:
- means for determining a set of 2D components of the direction vector at each of a set of vertices of the polygon in a coordinate space of the direction-dependent texture map;
- means for interpolating the 2D components and the coordinate space across the polygon;
- means for obtaining a subset of the parameters for each pixel from the direction-dependent texture map;
- means for determining a color value for each pixel in response to the 2D components and the subset of the parameters.

8. The graphics system of claim 7, wherein the means for determining a set of 2D components of the direction vector comprises:
- means for assigning spatial texture coordinates in the coordinate space at each vertex of the polygon;
- means for determining the direction vector at the vertices of the polygon;
- means for projecting the direction vectors at the vertices into the coordinate system.

9. The graphics system of claim 7, wherein the means for determining a color value comprises:
- means for determining a texel value by evaluating the polynomial equation in response to the 2D components and the subset of the parameters;
- means for transforming the texel value into the color value.

10. The graphics system of claim 9, wherein the means for transforming comprises a lookup table means.

11. The graphics system of claim 9, wherein the means for transforming comprises a 3×4 color transform means.

12. A method for rendering a 3D object, comprising the steps of:
- generating a direction-dependent texture map that holds a set of parameters for a polynomial equation that defines a surface structure in a manner in which the appearance of the surface structure varies in response to a direction vector;
- rendering a polygon of the 3D object with the surface structure by evaluating the polynomial equation using the direction vector and the parameters.

13. The method of claim 12, wherein the direction vector is a light source vector.

14. The method of claim 12, wherein the direction vector is an eye point vector.

15. The method of claim 12, wherein the step of generating a direction-dependent texture map includes the step of generating a set of coefficients for the polynomial equation in response to variation in the direction vector.

16. The method of claim 12, wherein the step of rendering includes the step of evaluating the polynomial equation in response to a set of 2D components of the direction vector.

17. The method of claim 16, wherein the 2D components lie in a plane of the polygon.

18. The method of claim 12, wherein the step of rendering comprises the steps of:
- determining a set of 2D components of the direction vector at each of a set of vertices of the polygon in a coordinate space of the direction-dependent texture map;
- interpolating the 2D components and the coordinate space across the polygon;
- obtaining a subset of the parameters for each pixel from the direction-dependent texture map;
- determining a color value for each pixel in response to the 2D components and the subset of the parameters.

19. The method of claim 18, wherein the step of determining a set of 2D components of the direction vector comprises the steps of:
- assigning spatial texture coordinates in the coordinate space at each vertex of the polygon;
- determining the direction vector at the vertices of the polygon;
- projecting the direction vectors at the vertices into the coordinate system.

20. The method of claim 19, wherein the step of determining a color value comprises the steps of:
- determining a texel value by evaluating the polynomial equation in response to the 2D components and the subset of the parameters;
- transforming the texel value into the color value.

* * * * *